No. 827,263. PATENTED JULY 31, 1906.
T. S. PATTERSON.
CENTRIFUGAL FILTER.
APPLICATION FILED APR. 18, 1905.

WITNESSES:
Wm H. Campfield
Frank L. Stubbs.

INVENTOR
Thomas S. Patterson.
BY
W. B. Hutchinson.
ATTORNEY

UNITED STATES PATENT OFFICE.

THOMAS S. PATTERSON, OF NEW YORK, N. Y.

CENTRIFUGAL FILTER.

No. 827,263. Specification of Letters Patent. Patented July 31, 1906.

Application filed April 18, 1905. Serial No. 256,190.

*To all whom it may concern:*

Be it known that I, THOMAS S. PATTERSON, of the city, county, and State of New York, have invented a new and Improved Centrifugal Filter, of which the following is a full, clear, and exact description.

My invention relates to improvements in filters, and particularly to centrifugal machines of this character which filter oil, although my machine can be used for any analogous purpose.

The object of my invention is to produce a simple machine which is adapted to filter a large quantity of oil and which can be readily arranged so as to filter oil or other matter to the extent desired.

Another object of my invention is to provide means for easily getting at the filtering parts for draining the oil as it is filtered and for permitting steam to enter the filter, so as to thin the oil and make it pass easily through the filtering medium, and also to more easily precipitate the dirt and other impurities in the oil. In arranging for the admission of steam to the filtering parts I prefer to use exhaust-steam from a turbine which is used to drive the filter, though steam can be admitted in other ways and the centrifugal portion of the machine may be driven by other means.

With these ends in view my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1:
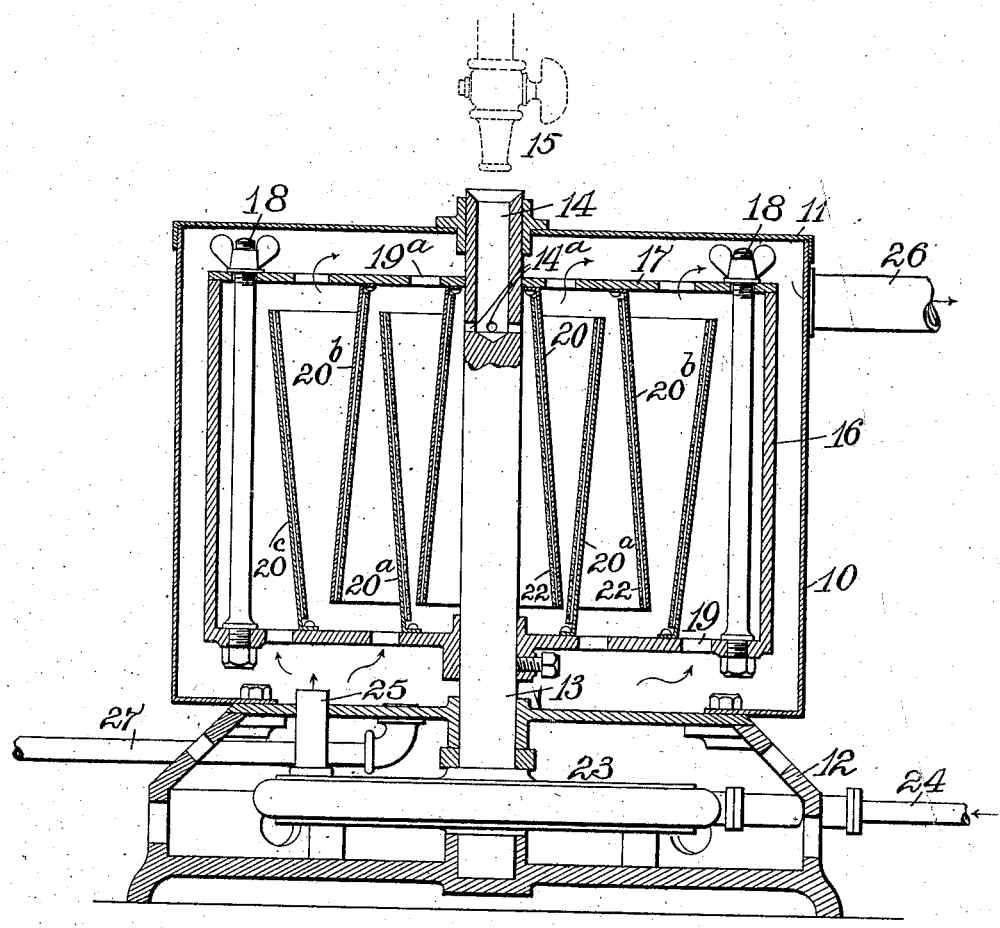
Figure 2:
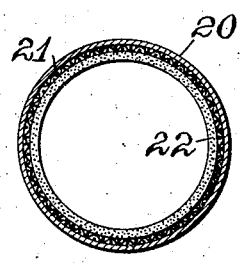

Figure 1 is a vertical section of a machine, showing my improvements; and Fig. 2 is a cross-section through one of the filtering cones or funnels.

The machine can be of any approved design, and I have shown it provided with an inclosing casing 10, having for convenience a removable top 11 and mounted on a suitable base 12. Extending vertically through the casing is a rotary shaft 13, which at the top is bored out, as shown at 14, to provide an oil-receptacle, though obviously the oil-receptacle may be separate or attached to the shaft, if desired. The construction shown is preferred, however, and from the receptacle are ports $14^a$, through which the oil passes to the interior of the filter. The oil is supplied to the receptacle 14 from a nozzle 15 or from any suitable funnel or source of supply.

Within the casing 10 is the drum 16, which is carried by the shaft 13 and which has for convenience a removable top 17, this being held to the drum by bolts 18 or equivalent fastenings. On the bottom and top of the drum are holes 19 and $19^a$ to permit steam to pass through the drum and liquefy the oil thereon. Within the drum are a number of partitions 20, each being shaped, preferably, like a frustum of a cone, though the only essential thing is that they be inclined and be oppositely arranged, as shown, to form alternating chambers. In the drawings I have shown a series of these partitions 20, $20^a$, $20^b$, and $20^c$. It will be seen that the open ends of the chambers are alternately placed, the smaller end being fixed to the top and bottom, respectively, of the drum 16, and, as illustrated, the inner partition 20 is fixed to the top 17, the next, $20^a$, to the bottom of the drum 16, and so on. Each partition is lined with wire mesh 21, which does not show in Fig. 1, as it would confuse the drawings; but it shows clearly in Fig. 2. The object of this wire mesh is to hold the filtering-cloth 22 from contact with the wall of the partition 20 $20^a$, &c., and provide space for the oil to trickle down the wall of the partition. I refer to the part 22 as a "cloth;" but it can be any suitable fabric and is by preference a relatively close cloth, so that the oil will be forced through it; but the dirt and other matter in the oil will be retained by it.

Below the casing 10 and within the hollow base 12 is a turbine 23, which can be of any approved type and which is fast to the shaft 13. This is driven by steam from a pipe 24, and the exhaust rises through a pipe 25 into the casing. The final exhaust passes out from the casing through the pipe 26. The filtered oil flows from the casing through a pipe 27 to a suitable receptacle. It will be seen, of course, that the shaft 13 may be rotated by other means without affecting the principle of my invention and that if the shaft is rotated by other means steam can be admitted to the casing 10 in any suitable way. I prefer the structure shown, however, as it provides a very simple means of forming the two functions of rotating the filter and admitting steam thereto.

When the filter is started up and oil is admitted, the oil flows through the ports $14^a$ and is caught on the cloth 22 of the inner partition 20. The oil is forced through the cloth and trickles down the wire mesh and the partition to the space below, and the centrifugal action of the filter causes it to fly out to the wall of the next partition 20ª and through the cloth thereof until it eventually flows over the top, owing to the inclination of the said wall, and then it travels down the third wall 20ᵇ, and so on. It is apparent that any necessary number of partitions from one up can be used according to circumstances. The action of the filter is progressive—that is, when the oil strikes the smaller portion of a partition it will at first go right through the portion on which it impinges, but presently that part of the cloth will become filled with dirt and the oil will go through a little farther along the cloth, and so on, until the cloth is charged with dirt and other impurities. When this condition is reached, the filter can be opened and the cloths removed and new ones put in their place.

From the foregoing description it will be seen that the gist of the invention lies in the arrangement of the inclined partitions and their filtering-cloths and the wire mesh. It will also be understood that while I illustrate the partitions as flaring and circular they are not necessarily so, but are preferably inclined and placed with the adjacent ones oppositely pitched.

Having thus fully described my invention, I claim as new and desire to secure by Letters Patent—

1. A centrifugal filter, comprising a casing having a steam inlet and outlet and having drainage means at the bottom, a rotatable drum mounted within the casing, and a series of concentric flaring partitions arranged within the drum, the said partitions being oppositely pitched and attached at their smaller ends to the top and bottom portions of the drum.

2. A centrifugal filter, comprising a rotatable drum arranged to turn on a vertical axis, means for admitting steam to the drum, and a series of concentrically-arranged flaring partitions of opposite pitch held within the drum with their smaller ends attached to the top and bottom portions of the drum the said partitions being lined with a dirt-collecting medium.

3. A centrifugal filter, comprising a rotatable drum arranged to turn on a vertical axis, means for admitting steam to the drum and for draining liquid from the bottom thereof, and a series of concentrically-arranged flaring partitions attached at their smaller ends to the end portions of the drum the said partitions being cloth-lined and having the cloth covered with a wire screen.

4. A centrifugal filter, comprising a vertical rotatable shaft hollow at the upper end and with side ports leading from the said hollow to the sides, a drum carried by the shaft, and a series of concentrically-arranged flaring partitions of opposite pitch secured at their smaller ends to the end portions of the drum.

THOMAS S. PATTERSON.

Witnesses:
 ETHEL GRIEST,
 MARY B. MARR.